US007831767B2

(12) United States Patent
Nakajima

(10) Patent No.: US 7,831,767 B2
(45) Date of Patent: *Nov. 9, 2010

(54) STORAGE CONTROL SYSTEM, CONTROL METHOD FOR STORAGE CONTROL SYSTEM, PORT SELECTOR, AND CONTROLLER

(75) Inventor: Akio Nakajima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/683,026

(22) Filed: Jan. 6, 2010

(65) Prior Publication Data

US 2010/0115143 A1 May 6, 2010

Related U.S. Application Data

(63) Continuation of application No. 11/527,497, filed on Sep. 27, 2006, now Pat. No. 7,761,657.

(30) Foreign Application Priority Data

Jul. 10, 2006 (JP) ............................. 2006-189782

(51) Int. Cl.
G06F 11/08 (2006.01)
G06F 13/12 (2006.01)
(52) U.S. Cl. ..................... 711/112; 714/5; 714/42; 714/E11.021
(58) Field of Classification Search ................ None
See application file for complete search history.

(56) References Cited

U.S. PATENT DOCUMENTS 5,119,488 A 6/1992 Takamatsu et al.

(Continued)

FOREIGN PATENT DOCUMENTS

JP 2002-251332 9/2002

(Continued)

OTHER PUBLICATIONS

European Search Report in EP 07251011, dated Jan. 12, 2010; Annex to European Search Report In European Patent Appln. No. EP 07251011, dated Jan. 12, 2010.

Primary Examiner—Shane M Thomas
Assistant Examiner—Hal Schnee
(74) Attorney, Agent, or Firm—Antonelli, Terry, Stout & Kraus, LLP.

(57) ABSTRACT

An object of the present invention is to provide a means for detecting a logical command error, and a storage system and its control method that can properly perform error handling, and detection and blockage of a malfunctioning section. A storage control system includes controller units 130A and 130B for performing processing for data I/O to/from drives 150 and 160 in response to a data I/O request from a host device 100, switches 140A and 140B connecting the controller units 130A and 130B and the drives 150 and 160, and a port selector 300 inserted between the switches 140A and 140B and the drive 160. The port selector 300, when receiving a command generated based on processing performed by an MPU 131, accesses a target drive 160 if that data that forms a command is valid. Meanwhile, if the port selector 300 detects logical command inconsistency, the port selector 300 forwards that detection result to the MPU 131 via the switch 140A or 140B and requests retry processing from the MPU 131.

18 Claims, 13 Drawing Sheets

U.S. PATENT DOCUMENTS

| | | |
|---|---|---|
| 2003/0236952 A1 | 12/2003 | Grieff et al. |
| 2004/0205288 A1 | 10/2004 | Ghaffari et al. |
| 2005/0081088 A1 | 4/2005 | Tanaka et al. |
| 2005/0108472 A1 | 5/2005 | Kanai et al. |
| 2005/0114728 A1 | 5/2005 | Aizawa et al. |
| 2005/0120263 A1 | 6/2005 | Kano et al. |
| 2006/0047900 A1 | 3/2006 | Tanaka et al. |
| 2006/0069947 A1 | 3/2006 | Takahashi et al. |
| 2006/0085671 A1 | 4/2006 | Majni et al. |

FOREIGN PATENT DOCUMENTS

| | | |
|---|---|---|
| JP | 2004-530964 | 10/2004 |
| JP | 2005-031928 | 2/2005 |
| JP | 2005-084799 | 3/2005 |
| JP | 2005-183420 | 7/2005 |
| JP | 2005-327230 | 11/2005 |
| WO | WO 02/23547 | 3/2002 |

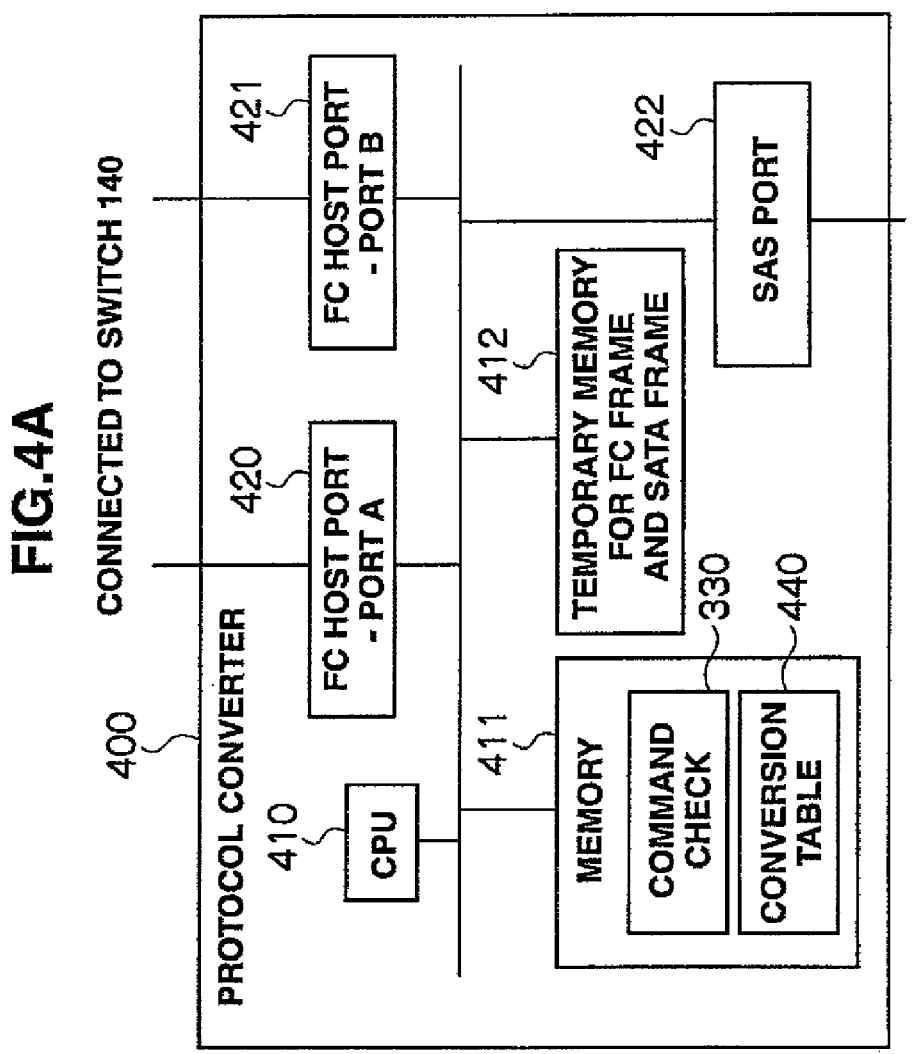

CONFIGURATION INFORMATION TABLE

| CHASSIS # (611) | DRIVE # (612) | DRIVE PORT ID (WWN) (613) | DRIVE TYPE (614) | CALCULATION ALGORITHM # (615) |
|---|---|---|---|---|
| 1 | 1 | XXXX XXXX XXXX XXXX | SAS DRIVE | 1 |
| 1 | 2 | XXXX XXXX XXXX XXXX | SAS DRIVE | 1 |
| ... | ... | ... | ... | ... |
| 2 | 1 | XXXX XXXX ZZZZ ZZZZ | SATA DRIVE | 2 |
| ... | ... | ... | ... | ... |
| ... | ... | ... | ... | ... |

CHECKSUM CALCULATION ALGORITHM TABLE

| CALCULATION ALGORITHM # (621) | CALCULATION ALGORITHM (622) | LIST OF CHECK TARGET COMMANDS (623) | DEVICE ON PATH (624) |
|---|---|---|---|
| 1 | Function (A) | Read, Write, Verify,,, | SAS DRIVE |
| 1 | Function (B) | Read/Write FPDMA | PORT SELECTOR, SAS DRIVE |
| 3 | ... | ... | PROTOCOL CONVERTER, SAS DRIVE |
| ... | ... | ... | ... |
| ... | ... | ... | ... |
| X | NULL | NULL | UNSUPPORTED |

SATA READ/WRITE FPDMA QUEUED COMMAND

| Register | 7 | 6 | 5 | 4 | 3 | 2 | 1 | 0 | |
|---|---|---|---|---|---|---|---|---|---|
| Feature | \multicolumn{8}{c|}{Sector Count [7:0]} | ⎫ 802 CALCULATION TARGET |
| Feature (exp) | Sector Count [15:8] | |
| Sector Count | TAG | Reserved(000b) | |
| Sector Count (exp) | INSERT CHECKSUM INTO RESERVED AREA | — 801 |
| LBA Low | LBA [7:0] | ⎫ |
| LBA Low (exp) | LBA [31:24] | |
| LBA Mid | LBA [15:8] | |
| LBA Mid(exp) | LBA [39:32] | 802 CALCULATION TARGET |
| LBA High | LBA [23:16] | |
| LBA High (exp) | LBA [47:40] | |
| Device | FUA | (1b) | RSV | (0b) | Reserved(0b) | |
| Command | Read/Write FPDMA Queued (60h/61h) | ⎭ |

COMMAND DESCRIPTION BLOCK (CDB) FOR SCSI READ (10) COMMAND

| Byte\Bit | 7 | 6 | 5 | 4 | 3 | 2 | 1 | 0 | |
|---|---|---|---|---|---|---|---|---|---|
| 0 | \multicolumn{8}{c|}{Operation Code: Read(10) (28h)} | ⎫ |
| 1 | PROTECTED | DPO | FUA | RSV | FUA_NV | Obs | |
| 2 | LBA [31:24] | 802 CALCULATION TARGET |
| 3 | LBA [23:16] | |
| 4 | LBA [15:8] | |
| 5 | LBA [7:0] | ⎭ |
| 6 | INSERT CHECKSUM INTO RESERVED AREA | — 801 |
| 7 | Transfer Length [15:8] | ⎫ 802 CALCULATION TARGET |
| 8 | Transfer Length [7:0] | |
| 9 | CONTROL | ⎭ |

(CDB) COMMAND DESCRIPTION BLOCK (CDB) FOR SCSI WRITE (10) COMMAND

| Byte\Bit | 7 | 6 | 5 | 4 | 3 | 2 | 1 | 0 | |
|---|---|---|---|---|---|---|---|---|---|
| 0 | \multicolumn{8}{c|}{Operation Code:Write(10) (2Ah)} | ⎫ |
| 1 | PROTECTED | DPO | FUA | RSV | FUA_NV | Obs | |
| 2 | LBA [31:24] | 802 CALCULATION TARGET |
| 3 | LBA [23:16] | |
| 4 | LBA [15:8] | |
| 5 | LBA [7:0] | ⎭ |
| 6 | INSERT CHECKSUM INTO RESERVED AREA | — 801 |
| 7 | Transfer Length [15:8] | ⎫ 802 CALCULATION TARGET |
| 8 | Transfer Length [7:0] | |
| 9 | CONTROL | ⎭ |

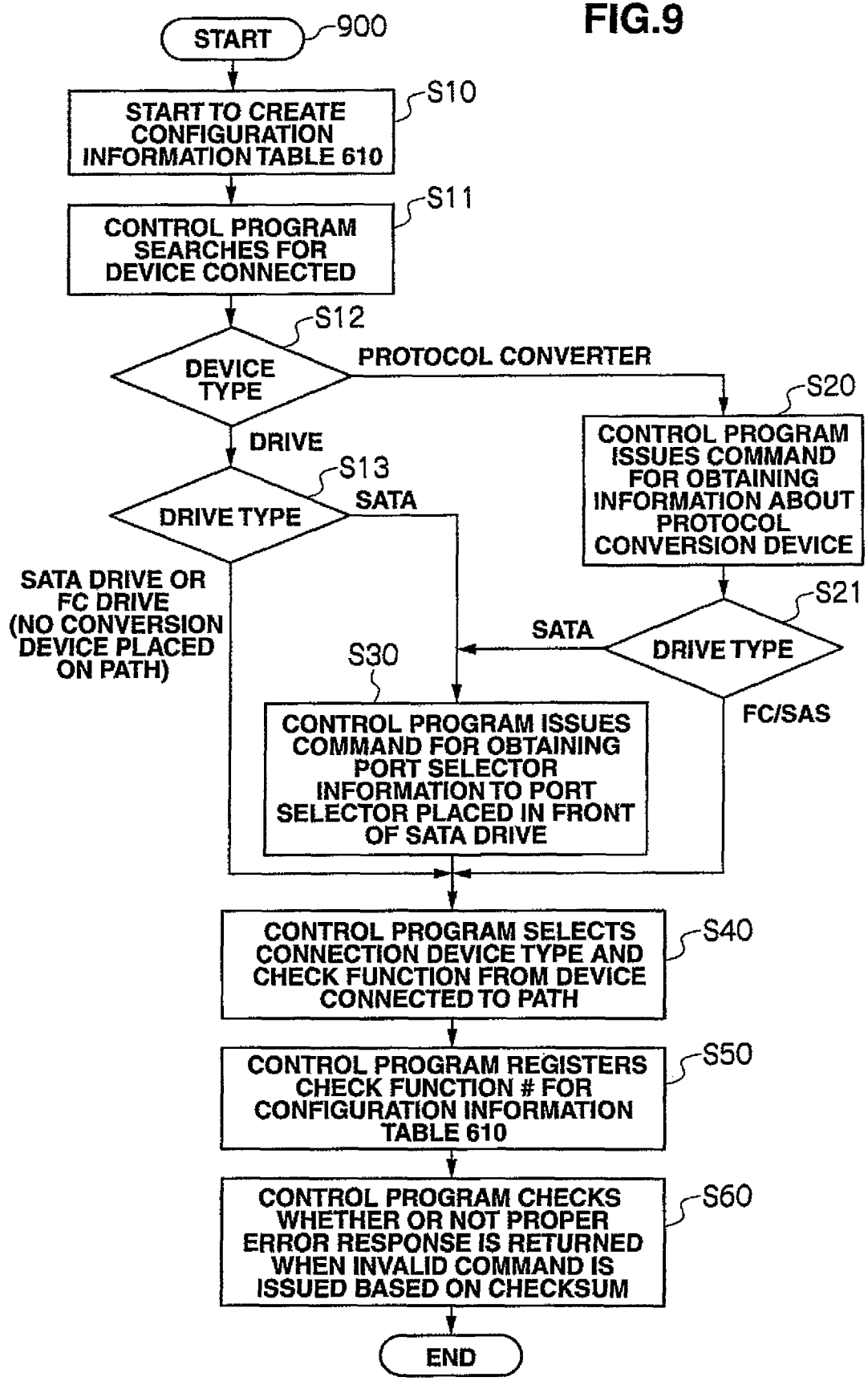

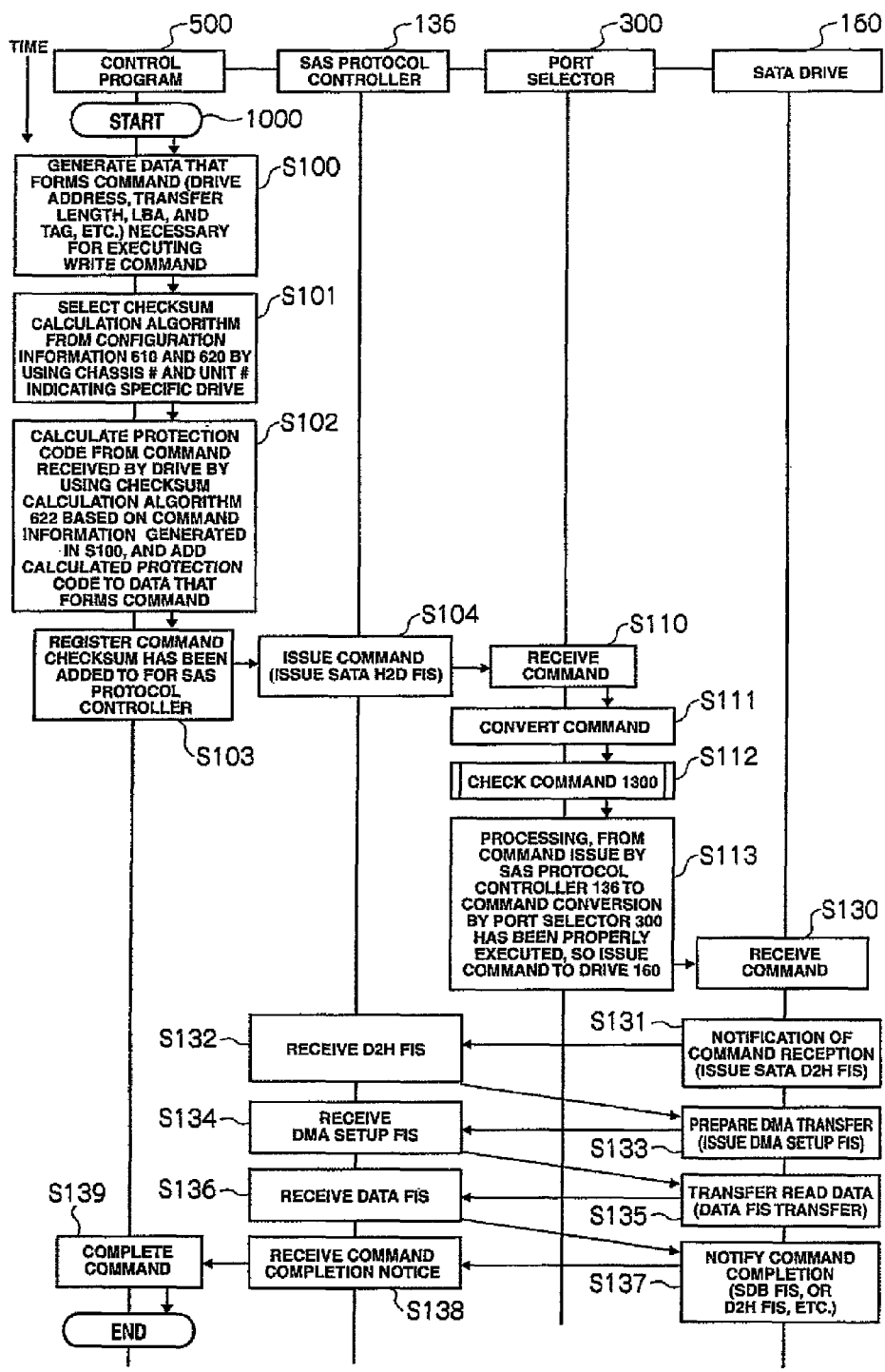

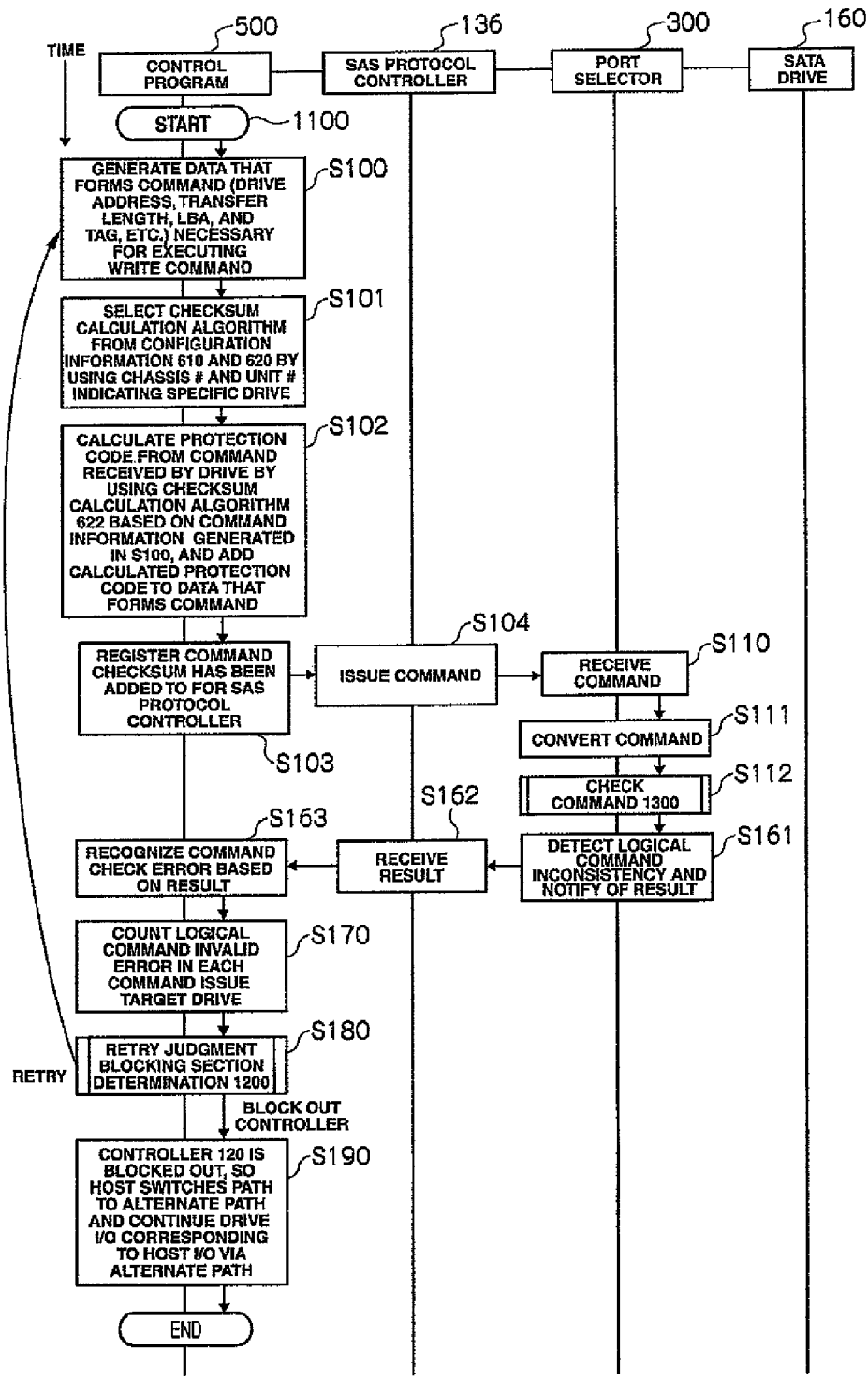

US 7,831,767 B2

STORAGE CONTROL SYSTEM, CONTROL METHOD FOR STORAGE CONTROL SYSTEM, PORT SELECTOR, AND CONTROLLER

CROSS-REFERENCES TO RELATED APPLICATIONS

This application is a continuation of U.S. application Ser. No. 11/527,497, filed Sep. 27, 2006 now U.S. Pat. No. 7,761,657. This application relates to and claims priority from Japanese Patent Application No. 2006-189782, filed on Jul. 10, 2006, the entire disclosures of which are incorporated herein by reference.

BACKGROUND

1. Field of the Invention

The invention relates to a storage control system in which control units are multiplexed and the control units access a common memory unit, and a control method for that system.

2. Description of Related Art

A mid-range storage control unit having dual control units that access common storage devices in one chassis has been proposed (See JP-A-2005-31928). In that storage control device, storage devices are arranged in arrays in the chassis, and the control units can access the storage devices via a separately provided connection system (connection path).

Each control unit, upon receipt of an I/O request from a host device, which is a host system, accesses the I/O request target storage device. The control unit includes an MPU that controls the entire control unit, cache memory, a port connected to a host device, a disk controller as an initiator that manages, under the control of the MPU, access to a data I/O request target hard disk drive from among a plurality of storage devices (hard disk drives) via an access system, and a data controller that controls data exchange between the MPU, cache memory, and disk controller.

Routes the control unit accesses the storage device through according to the I/O request from the host device include a route that passes through a disk controller in a first control unit and a first connection path, and a route that passes through a disk controller in a second control unit and a second connection path. When the control unit accesses the storage devices via those routes, communication between the control unit and the hard disk drives cannot be performed if disconnection or a connection failure occurs in either of the routes. Therefore, a port bypass circuit for bypassing (separating) part of the routes or hard disk drive is provided in case connection failure or disconnection occurs in the routes.

Meanwhile, JP-A-2004-530964 discloses a method for verifying whether or not a data block has been damaged by judging, for the purpose of maintaining data integrity, whether or not any data block has been broken by performing a logical check on data included in a data block after performing a physical checksum calculation, writing a data block in nonvolatile memory after the data block passes the logical check, then reading the data block from the nonvolatile memory, performing physical checksum verification on the data block, and also performing logical check on the data included in the data block.

There is also a method for, when a series of data is read out in blocks from a storage device and that data is stored in a data storage unit in a data controller, updating data stored in the data storage unit with write data if a write target block for the write data is a block stored in the data storage unit; and, if the write target block for the write data is not a block stored in a data storage position generating an guarantee code based on a series of data stored in the data storage unit, adding the guarantee code to that data series, and transferring that data (see JP-A-2005-84799). Techniques disclosed in JP-A-2005-183420, JP-A-2002-251332, and JP-A-2005-327230 relate to the same technical field.

JP-A-2002-251332 discloses, for the purpose of providing an information transfer processing device for verifying processing for converting data transferred between a host device and a slave device, an information conversion processing device for controlling data transfer between an information processing device and at least one storage device, the device being provided between the information processing device and the storage device(s), including a physical information generator for converting logical transfer information about transfer from the information processing device to the storage devices, and a verification unit for verifying whether or not the conversion performed in the physical information generator has been properly performed and outputting the verification result.

JP-A-2005-327230 discloses, owing to the need for an electronic switch that enables two host ports to simultaneously access a single-port type storage unit connected to a device port in a switch via a serial advanced technology attachment (serial ATA) link or an advanced technology attachment (ATA) link, a switch including a first serial ATA port connected to a first host unit, a second serial ATA port connected to a second host unit, a third serial ATA port connected to a device, an arbitration/control circuit for selecting either of the first or second host unit that is to be connected to the device via the switch every time either the first or second host unit transmits a command executed by the device.

If command translation processing has to be performed in a control unit based on command information when the control unit accesses a storage device, a corrupted bit caused by an α-ray cannot be detected just by performing parity calculation to prevent a invalid command, and reception of an invalid command and execution of incorrect IO access by a hard disk drive are prevented.

In a technique disclosed in JP-A-2005-183420, because a diffusion layer (gate area) forming node capacity decreases in accordance with a decrease in memory size or wire size, the node capacity decreases accordingly and soft error problems occur. Those soft errors occur when a memory cell is radiated with an α-ray or neutron ray. Data potential accumulated in the node capacity moves to the side of a semiconductor board, and the data disappears.

An object of the present invention is to provide a means for detecting, if data has been corrupted when translating data that forms a command between a storage device and a control unit, the corrupted data that forms the command, and to provide a storage control system and method for preventing incorrect IO access to a hard disk drive so that a controller can execute proper error handling.

SUMMARY

To achieve the above-stated object, the present invention provides a storage control system having dual control units. In this system, a port selector placed on any one of a plurality of paths connecting a control unit with memory unit and controlling data I/O judges, when receiving a command, whether or not a command error has occurred, and performs processing according to that judgment for at least the control unit.

According to the present invention, if, in the process of transfer of a command generated in a control unit to a storage device, data that forms the command is corrupted while that data is subjected to data translation processing, a section in which the data that forms the command is verified is prevented from transferring the corrupted command to the storage device and a controller is notified of the error, so that the controller can execute proper error handling.

More specifically, a storage control system according to the present invention includes: a memory unit having a plurality of storage devices; a plurality of control units for performing processing for data I/O to/from the memory unit in response to a data I/O request from a host device, each control unit including memory for storing a control program, a controller for controlling all data I/O processing and generating a command in response to the data I/O request according to the control program, and an initiator for controlling, according to the command, access to the storage device that is the target of the data I/O request in the memory units; a plurality of connection paths connecting each of the control units to the memory unit; and a port selector placed on any of the connection paths for controlling data I/O, the port selector judging, when receiving the command, whether or not a command error has occurred, and performing processing in accordance with that judgment for at least the controller. If that judgment concerning the command returns "valid," the port selector accesses the target storage device via the relevant connection path; and if the judgment returns "invalid," the port selector forwards the "invalid" judgment to the controller via that connection path.

The present invention can provide a means for detecting, if data that forms a command is corrupted while that data is subjected to data translation processing and that data is transferred via a correct physical transfer path, a logical error in that command, and a storage system and control method that can execute the proper error handling.

BRIEF DESCRIPTION OF THE DRAWINGS

FIG. 4(A) is a block diagrams illustrating a protocol translation controller, and FIG. 4(B) is a mapping table for a protocol translation controller.

FIG. 6(a) is a diagram showing a configuration information table, and FIG. 6(b) is a diagram showing a checksum calculation algorithm table.

FIG. 8(a) is a SATA Read/Write FPDMA Queued command frame format, FIG. 8(b) is an SCIC Read command frame format, and FIG. 8(c) is an SCIC Write command frame format.

FIG. 9 is a flowchart for acquiring storage system configuration information.

FIG. 10 is a flowchart illustrating processing in which the result of verifying command checksum is "valid."

FIG. 11 is a flowchart illustrating retry processing and processing in which the result of verifying command checksum is "invalid".

DETAILED DESCRIPTION OF PREFERRED EMBODIMENTS

Embodiments of the present invention will be described below with reference to the drawings. The embodiments do not limit the scope of claims, and features mentioned in the embodiments can be combined as appropriate.

Figure 1:
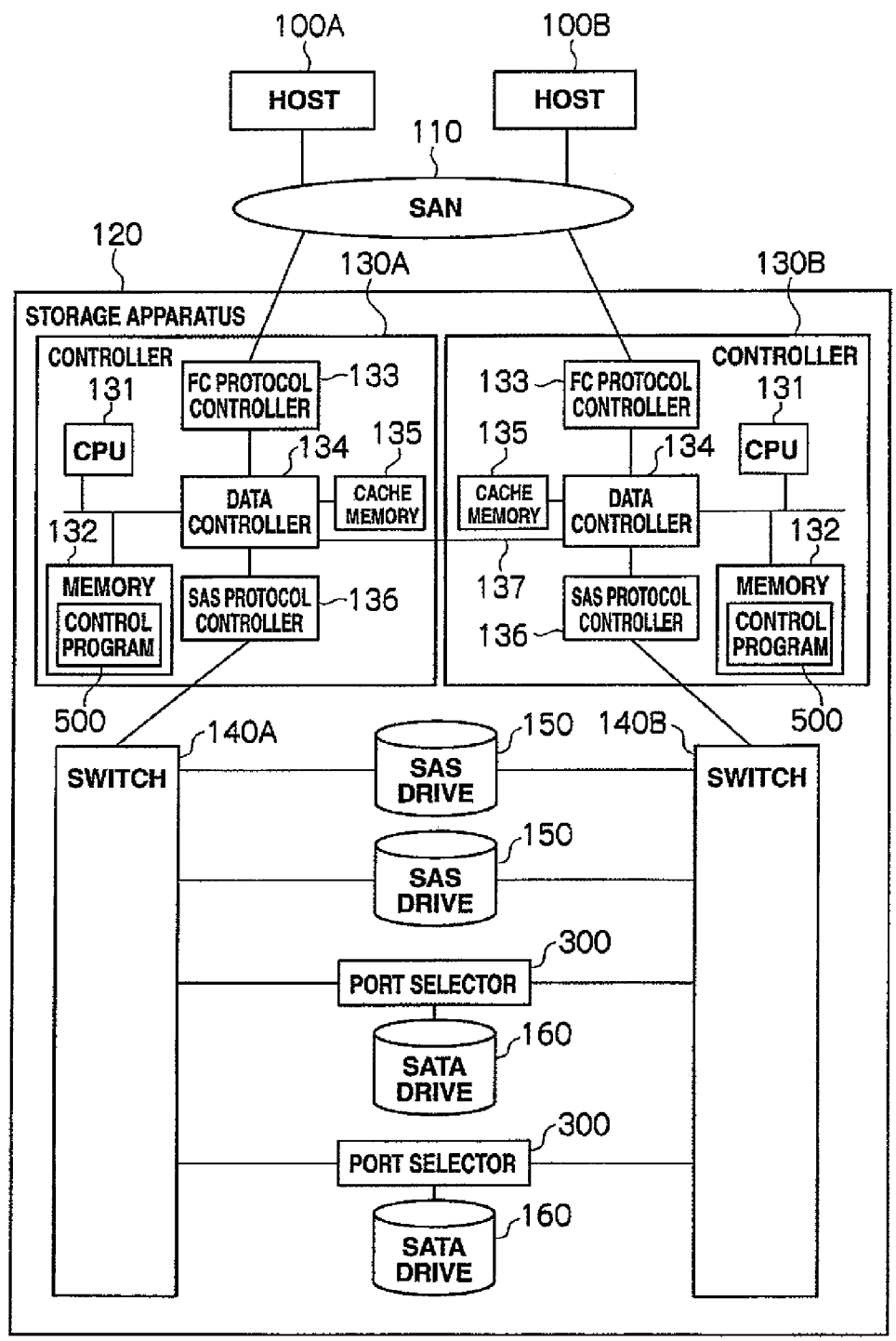
FIG. 1 is a block diagram of a storage control system according to the first embodiment of the present invention.
Figure 2:
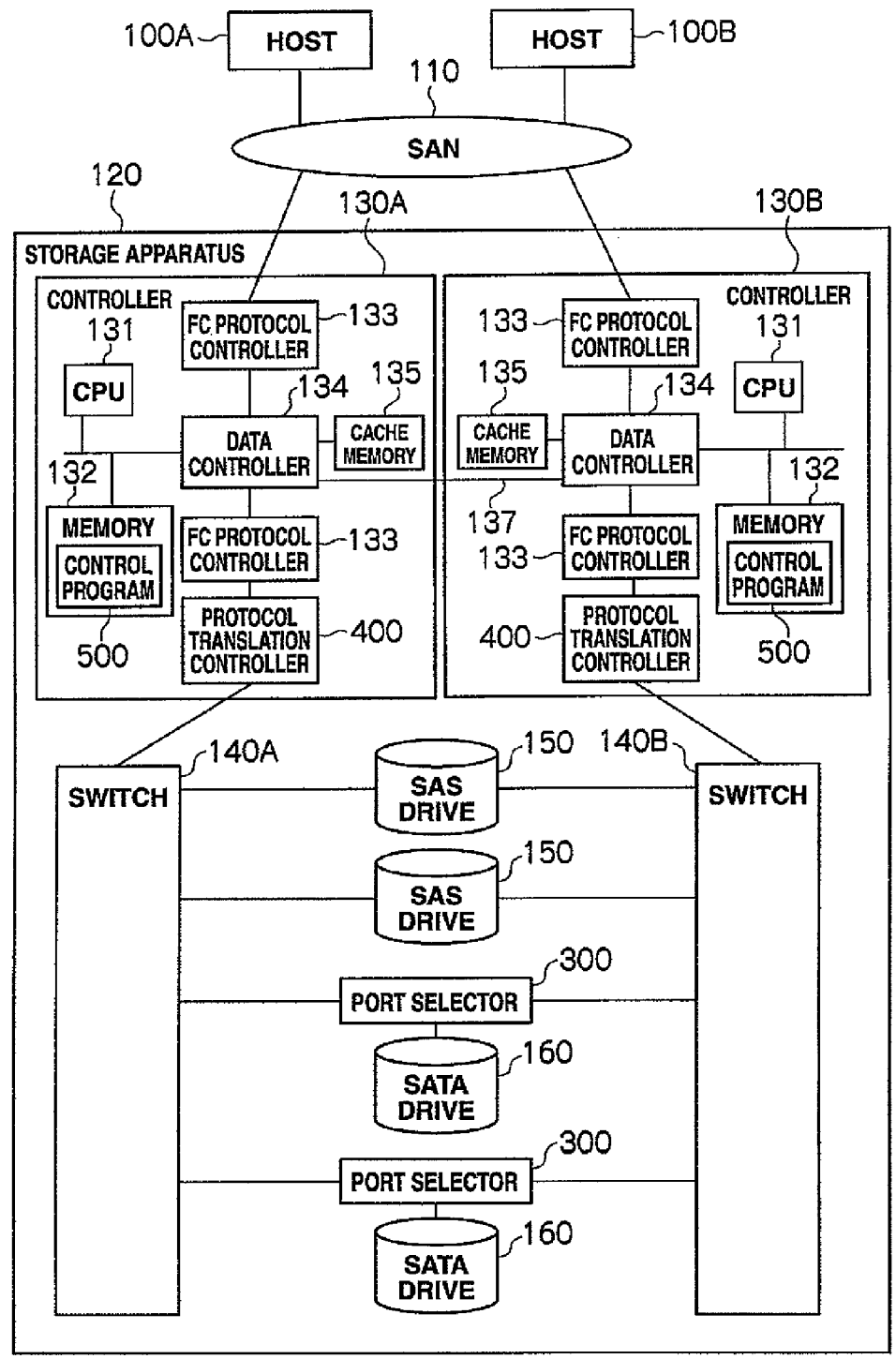
FIG. 2 is a block diagram of a storage control system according to the second embodiment of the present invention.

FIG. 1 is a block diagram showing a storage control system (disk array system) according to a first embodiment in the present invention, and FIG. 2 is a block diagram showing a storage control system (disk array system) according to a second embodiment. A storage system 120, being a storage control system, is connected to a plurality of host devices (master host devices) 100 via a communication network 110. Each host device 100 is a server, personal computer, work station, or mainframe, etc. that works as a master host device for the storage system 120. Examples of the communication network 110 include a LAN (local area network), SAN (storage area network), the Internet, and a dedicated line. The communication network 110 has host ports 110A and 110B that connect the host 100 and the storage system 120.

If the host is an open system, data transfer is performed according to a communication protocol such as TCP/IP (Transmission Control Protocol/Internet Protocol), FCP (Fibre Channel Protocol), or iSCSI (internet Small Computer System Interface). If the host is a mainframe, data transfer is performed according to a communication protocol such as FICON (Fibre Connection®), ESCON (Enterprise System Connection®), ACONARC (Advanced Connection Architecture®), or FIBARC (Fibre Connection Architecture®). The storage system 120 may function as NAS (Network Attached Storage) configured to receive, according to a protocol such as NFS (Network File System), a data output request by file name assignment from the host device 100.

The disk array system 120 includes dual control units 130A and 130B, switches 140A and 140B, Serial Attached SCSI (SAS) drives 150 and Serial Advanced Technology Attachment (SATA) drives 160 as disk drives, and a plurality of port selectors 300. The port selector 300 is a switch for expanding a single host port in the SATA drive 160 to two ports so that the SATA drive 160 can receive I/O requests from the dual controller. One example of a storage device is an FC drive.

The control units 130A and 130B are identical to each other, and each of them mainly includes an MPU 131, memory 132, a Fibre Channel (FC) Protocol controller 133, a data controller 134, a cache memory 135, and an Serial Attached SCSI (SAS) Protocol controller 136. The data controllers 134 in the control units 130A and 130B are connected to each other via a data mirroring bus 137. Meanwhile, in the second embodiment shown in FIG. 2, a Fibre Channel (FC) protocol controller 133 and a protocol translation controller 400 are included instead of the SAS protocol controller 136, but the rest of the components are the same as in the first embodiment shown in FIG. 1. The protocol translation controller 400 may be provided in the port selector 300. If an FC back-end is used, each port selector 300 may further function as the protocol translation controller 400.

The MPU (CPU) 131 is a processor that controls processing for data I/O (write access or read access, etc.) to/from a plurality of the SAS drives 150 and SATA drives 160 in response to data I/O requests from the host device 100, and controls the Fibre Channel Protocol controller 133, the data controller 134, the SAS protocol controller 136, and the protocol translation controller 400 by executing the control program stored in the memory 132 as local memory.

The data controller 134 controls, under the control of the MPU 131, data transfer between the Fibre Channel Protocol controller 133 and the cache memory 135. The cache memory 135 temporarily stores data exchanged with a front interface or back interface via the Fibre Channel Protocol controller 133.

The SAS protocol controller 136, being an initiator for controlling access to a data I/O request target storage device from among the SAS drives 150 and SATA drives 160 included in the memory unit, transmits, according to a protocol defining a command, data I/O requests to the respective storage devices (the SAS drives 150 and SATA drives 160) via the switch 140A or switch 140B.

Each of the switches 140A and 140B constitutes a connection path for connection between the control units 130A and 130B and the SAS drives 150 and SATA drives 160 included in the memory unit. The port selectors 300 are placed on a specific connection path from among those connection paths.

Figure 3B:
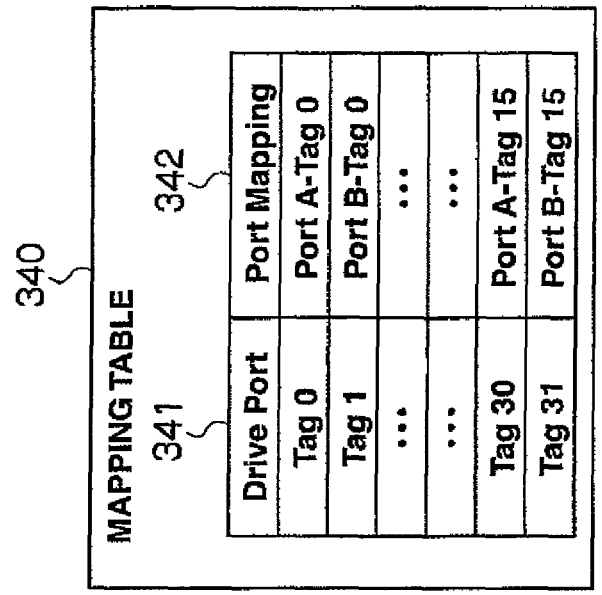
FIG. 3(B) is a mapping table for the port selector.
Figure 3A:
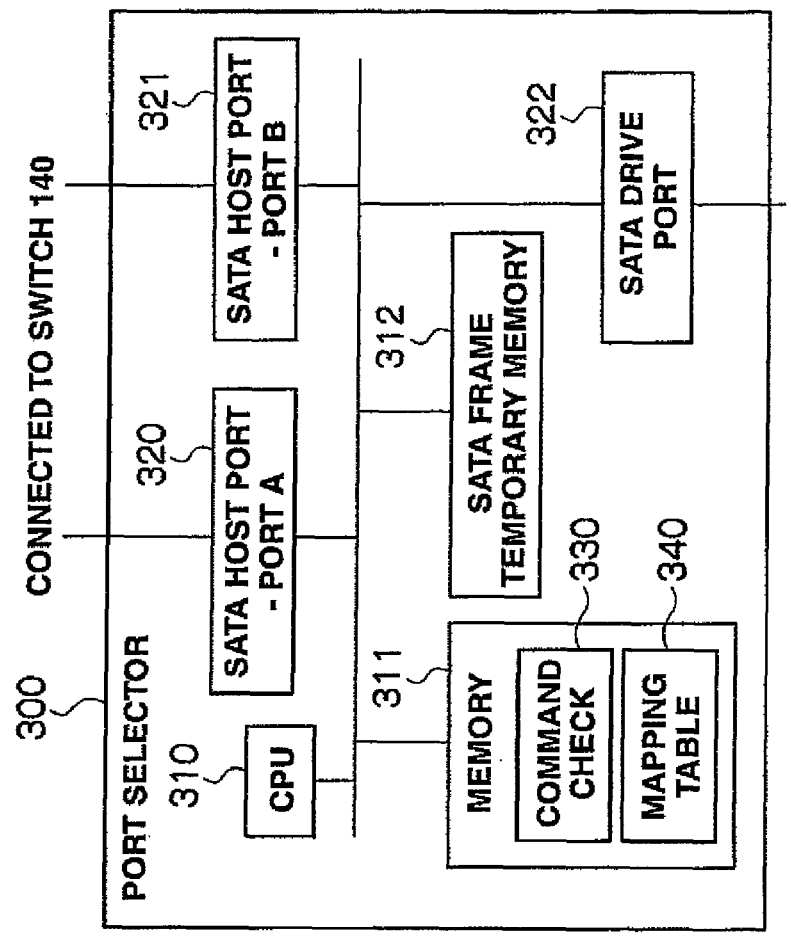
FIG. 3(A) is a block diagrams illustrating a port selector.

As shown in FIG. 3, each port selector 300 includes a CPU 310 that performs various calculations, memory 311, SATA frame temporary memory 312, a SATA host port (port A) 320 connected to the switch 140A, a SATA host port (port B) 321 connected to the switch 140B, and a SATA drive port 322 connected to the SATA drives 160. The memory 311 stores data relating to command verification program 330 and data relating to a mapping table 340. The mapping table 340 contains Tag 0 to Tag 31 that are data relating to a drive port 341. A host port 342 stores data relating to the host ports NB and Tag in a command at the host port side.

Meanwhile, as shown in FIG. 4, the protocol translation controller 400 includes a CPU 410 that performs various calculation processing, memory 411, temporary memory 412 for a Fibre Channel (FC) frame and SATA frame, a Fibre Channel (FC) host port (port A) 420 connected to the switches 140A and 140B, and an SAS port 422 connected to the switches 140A and 140B. The memory 411 stores data relating to the command verification program 330 and data relating to a translation table 440. The translation table 440 contains data relating to data read/write as SCSI CMD 441 data and its corresponding ATA CMD 442 data.

Figure 5:
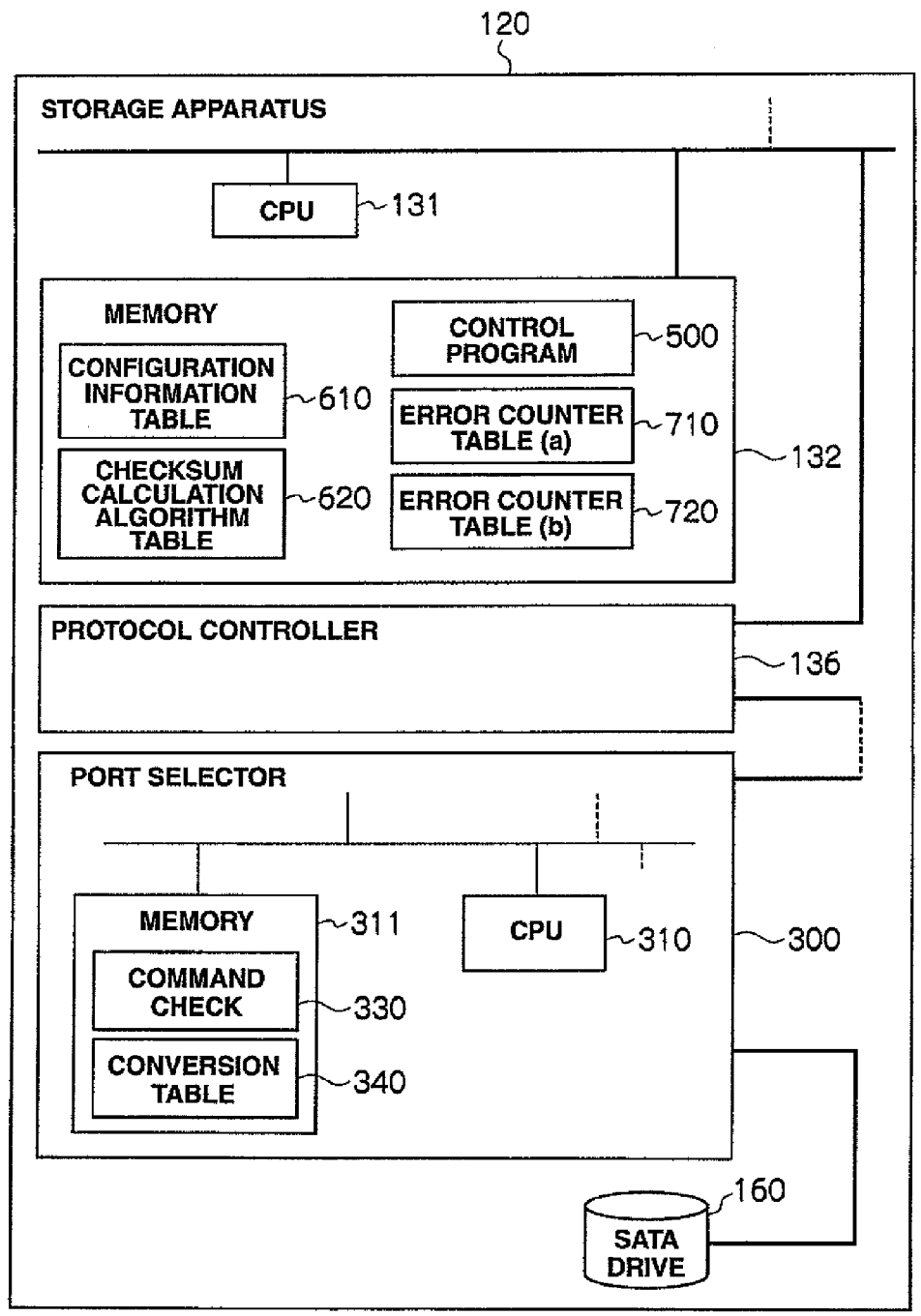
FIG. 5 is a diagram illustrating processing performed in a storage system, from command generation to command execution.

Next, the details of processing from generation to execution of a command in the storage system 120 will be described with reference to FIG. 5. The MPU (CPU) 131 controls all data I/O processing in response to the data I/O request from the host device 100. The MPU 131 controls commands based on a control program 500. For example, the MPU 131 generates a command based on the control program 500 when receiving an I/O request from the host device 100. At that point in time, data consistency is maintained with processing such as parity, ECC, and CRC between the local memory 132 to which data that forms the command received by the FCP controller 133 from the host device 100 is written and that maintains the data that forms a command that is to be issued to a hard disk drive, and a path (bus such as PCI or PCI-Express) through which the local memory 132 is accessed.

After that, the MPU 131 calculates a checksum in reference to the content of a configuration information table 610 shown in FIG. 6(*a*) and an algorithm table 620 shown in FIG. 6(*b*), and generates information including both command information and the checksum. If a command is issued to the SATA drive 160, the data that forms the command after being translated by the port selector can be calculated with the mapping table 340 in the port selector 300. Accordingly, the MPU 131 predicts the data that forms the command after being translated by the port selector 300 and calculates checksum for the above predicted data that forms the command based on a later-described checksum calculation algorithm 622, which is prepared taking the mapping table 340 in the port selector 300 into account. The configuration information table 610 contains data including the drive port ID (WWN: World Wide Name) 613, drive type 614, and calculation algorithm number 615 corresponding to the chassis number 611 and drive number 612. The algorithm table 620 contains data including the calculation algorithm 622, the list 623 of command types that are to be subjected to the command verification, and path device 624 corresponding to the calculation algorithm number 621.

During this processing, the data that forms the command is protected by the above calculated checksum, as well as parity, ECC, and CRC performed on the local memory and bus (PCI, PCI-Express, etc.). The SAS protocol controller 136 prepares a command frame corresponding to the protocol, adds CRC (cyclic redundancy check) to the prepared command frame, and issues the command frame CRC has been added to. A command frame issued by the SAS protocol controller 136 is protected by CRC for protecting a frame and checksum for protecting data that forms a command. When a command is forwarded to the port selector 300 via the switch 140A or 140B, the port selector 300 receives the command frame, verifies CRC for the command frame, and deletes that CRC if the CRC is correct. The port selector refers to the mapping table 340 and translates a Tag number in the information forming the command into a new Tag number corresponding to the port number of the port that has received the command frame and the previous Tag number. During that translation, the data that forms the command is protected by the checksum that has been calculated in advance and added by the MPU 131. After that, a CRC defined by the SATA protocol is added to the footer of the data that forms the command after translation to form a command frame. At this point in time, the command frame is protected by the CRC, and the data that forms the command is protected by the checksum calculated in advance by the MPU 131. After that, the port selector 300 verifies whether or not the command is logically correct by using the checksum that has been added in advance before the command was issued by MPU 131 based on the control program 500. More specifically, the command verification is performed for verifying for logically corrupted data in command information. The port selector 300 issues a command frame to a drive based on the command verification program 330 if the verification result is "valid", and abandons the command frame and issues an error notification to the controller if the verification result is "invalid." When a command is issued by the port selector 300 to a target drive, the SATA drive 160 receives a valid command that has passed the logical command verification, and performs processing in response to that access. The SATA drive 160 performs CRC processing for command protection.

As described above, the value of a checksum added to the data that forms a command does not change after the MPU 131 generates the command and the checksum until a drive receives the command frame. If the data is corrupted due to a soft error or the like in the process of changing the data that forms the command in the path, the port selector 300 can detect the corrupted data that forms the command, prevent any issue of incorrect command to drives, and notify the controller that proper error handling should be performed.

Figure 7A:
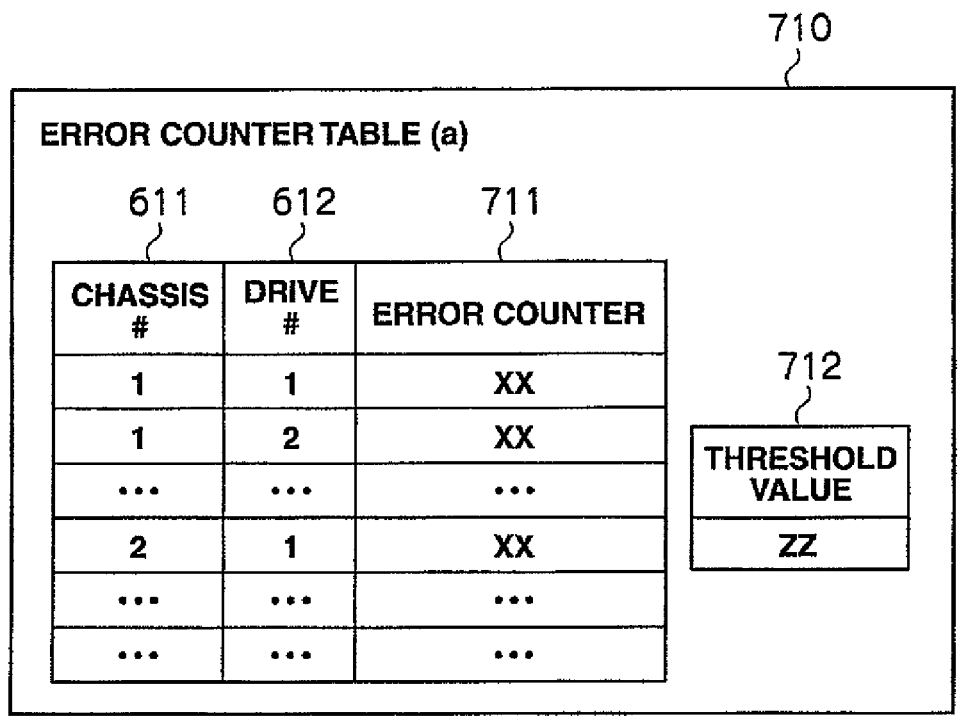
FIGS. 7(a) and (b) are diagrams showing error counter tables.
Figure 7B:
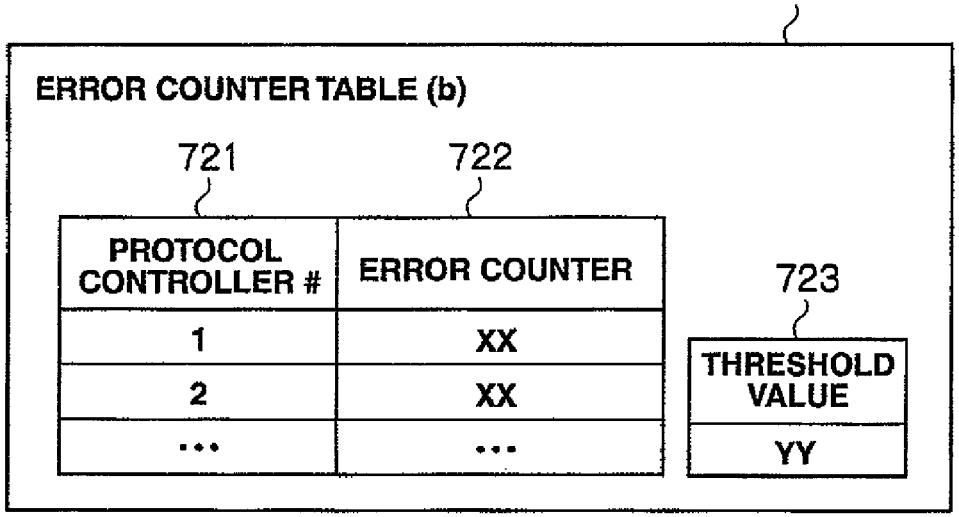

FIG. 7(A) shows the content of error counter tables 710 and 720 stored in the memory 132. As defined in the table in FIG. 7(B), the error counter table 710 contains data for the error counter 711 corresponding to the chassis number 611 and the drive number 612, and also contains data for the threshold value 712. The error counter table 720 contains data for the protocol controller number 720 and the error counter 722, and also contains data for a threshold value 723.

FIG. 8 (A) shows a frame information structure of a SATA Read/Write FPDMA Queued command 810, FIG. 8(B) shows a command description block (CDB) format 820 of an SCSI Read (10) command, and FIG. 8(c) shows a CDB format of an SCSI Write (10) command and an insertion position for a checksum 801. The target field 802 the checksum 801 is calculated for is just used as an example Next, processing for creating the configuration table 610 will be described with reference to FIG. 9. First, when the MPU 131 starts to create the configuration information table 610 (S10), the control program 500 searches for a connected device (S11). The control program 500 judges whether the device type is a protocol translation controller or a drive (S12), and judges the drive type if the device is a drive (S13). If the device type is a protocol translation controller in step S12, the control program 500 issues a command for acquiring device information about the protocol translation controller 400 (S20), and judges the drive type (S21). If the drive type is a SATA in step 13 or step 21, the control program 500 issues, to the port selector 300 placed in front of the SATA drive 160, a command for acquiring information for selecting a checksum calculation algorithm in the port selector 300, and proceeds to step S40 (S30).

Meanwhile, if the drive type is an SAS drive or FC drive (no converter device being connected in the middle of the connection path) in step S13, or if the drive type is FC/SAS in step S21, the control program 500 proceeds to step S40. In step S40, the control program 500 selects the connected device type and a checksum calculation function based on devices connected in the middle of the connection path (S40). Subsequently, the control program 500 registers the checksum calculation function number for the configuration information table 610 (S50), and performs processing for checking whether or not a drive makes a proper error response when a command having an invalid checksum is issued (S60). The processing in this routine ends here.

Next, processing performed when the result of command verification is "valid" will be described with reference to FIG. 10. First, the control program 500 generates, based on the result of the processing performed by the MPU 131, data that forms a command (drive address, transfer length, LBA, and Tag, etc.) necessary for executing a read command (S100), selects a checksum calculation algorithm 622 from the configuration information table 610 by referring to the chassis number and unit number indicating a specific drive (S101), calculates a checksum for a command received by the drive based on the command information generated in step S100 by using the calculation algorithm 622, adds that checksum to the data that forms a command generated in step S100 (S102), and registers the command the checksum has been added to for the SAS protocol controller 135. (S103). When a command is generated, the command is issued (SATA H2D FIS is issued) (S104). After that, the port selector 300, receiving the command (S110), converts the command, generates a CRC for the command frame after being subjected to command translation, (S111), and performs command verification (S112). If the result of the command verification is "valid," the port selector 300 issues the command to the drive 160 (S113). The SATA drive 160, receiving the command (S130), notifies the SAS protocol controller 136 of the receipt of the command (i.e. issues SATA D2H FIS) (S131). The SAS controller 136, receiving the D2H FIS (S132). The SATA drive 160 then prepares for DMA transfer (i.e. issues DMA Setup FIS) and forwards the prepared content to the SAS protocol controller 136 (S133). The SAS protocol controller 136, receiving the DMA Setup FIS (S134).

The SATA drive 160 then forward s read data (i.e. transmits Data FIS) to the SAS protocol controller 136. The SAS protocol controller 136, receiving the Data FIS (S136). The SATA drive 160 then notifies the SAS protocol controller of command completion (i.e. issues SDB FIS, or D2H FIS) (S137). The SAS protocol controller 136, notifies the control program 500 of command completion (S138). The control program 500, receiving the command completion notice, completes the processing for generating the command (S139), thereby ending the processing in this routine.

Next, retry processing and processing performed when the result of command verification is "invalid" will be described with reference to the flowchart shown in FIG. 11. First, the control program 500 performs, based on the result of the processing performed by the MPU 131, the processing in steps S100-S103 in the same manner as in the processing performed when the result of the command verification is "valid;" the SAS protocol controller 136 performs the processing in step S104; and the port selector 300 performs the processing in steps S110-S112. After that, if the port selector 300 detects corrupted data that forms the command as an error that has occurred in the process of command transfer, the port selector 300 notifies the SAS protocol controller 136 of that detection result (S161). The SAS protocol controller 136, receiving the detection result for the corrupted data that forms the command, forwards that reception notice to the control program 500 (S162). The control program 500, receiving the result of the logical command inconsistency detection, recognizes the command verification error (S163), and counts the command verification errors in each issue target drive (S170).

After that, the control program 500 determines whether or not to perform retry, also performs processing for determining which section has to be blocked out (S180), and goes back to step S100 according to the decision. If the control program 500 judges that the section that is to be blocked out is the controller (S180), the control program 500 forwards that judgment to the host device 100 (S180). The host device 100 switches the path to the controller to an alternate path when blocking out the controller included in the storage system 120 and continues to perform drive I/O according to host I/O via the alternate path (S190). The processing in this routine ends here.

Figure 12:
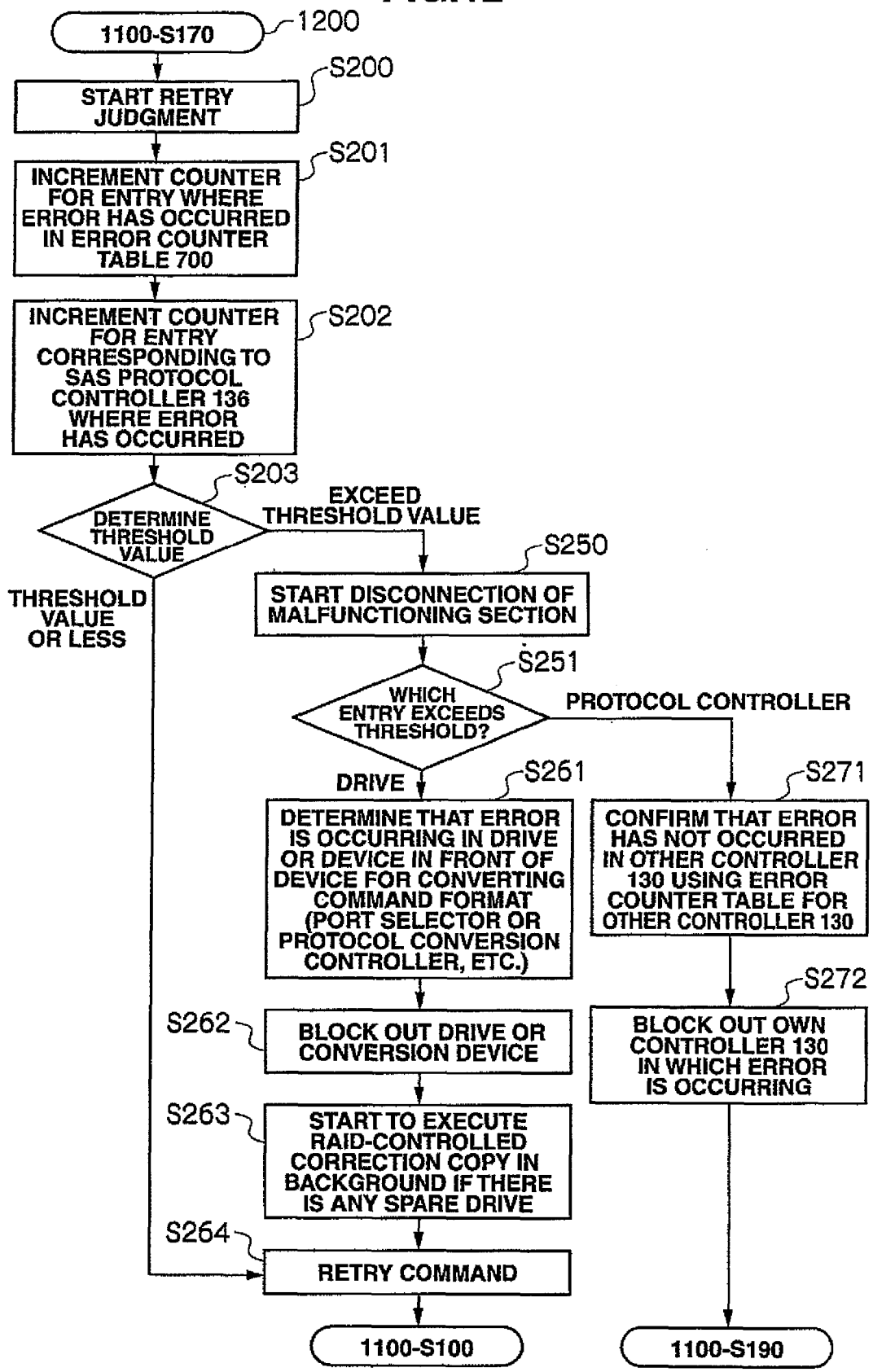
FIG. 12 is a flowchart illustrating retry processing for detecting a malfunctioning section and blocking out that section

Next, details of the retry judgment processing and blocking-section determination processing will be described according to the flowchart shown in FIG. 12, which shows the details of step 180 in FIG. 11. First, the control program 500 begins the retry judgment (S200), increments the counter in the entry in the error counter table 710 relevant to the drive where the error has occurred (S201), increments the counter in the entry relevant to the SAS protocol controller 136 where the error has occurred (S202), and compares the values in the counter with the respective threshold values (S203). If the counter value exceeds the threshold value, the control program 500 begins to disconnect the malfunctioning section (S250) and judges which section corresponds to the entry with the counter value exceeding the threshold (S251).

If the malfunctioning section is a drive in the above step, the control program 500 judges that an error has occurred in a drive or a device in front of the drive for converting the command format (the port selector 300 or the protocol translation controller 400, etc.) (S261), and blocks out the relevant drive or translation device (S262). After that, if the storage system has any spare drive, the control program 500 begins to perform RAID-controlled collection copy in the background (S263), performs processing for retrying the command in the same manner as when the counter value is the threshold value or less in step S203 (S264), and then returns to step S100 in FIG. 11.

Meanwhile, if the entry having a value exceeding the threshold value is related to the protocol controller 136 in step S251, the control program 500 confirms from the error counter table for the other controller 130B that no error has occurred in the other controller 130B (S271), performs processing for blocking out its own controller 130A (in which an error has occurring) (S272), and then proceeds to step S190 in FIG. 11.

Figure 13:
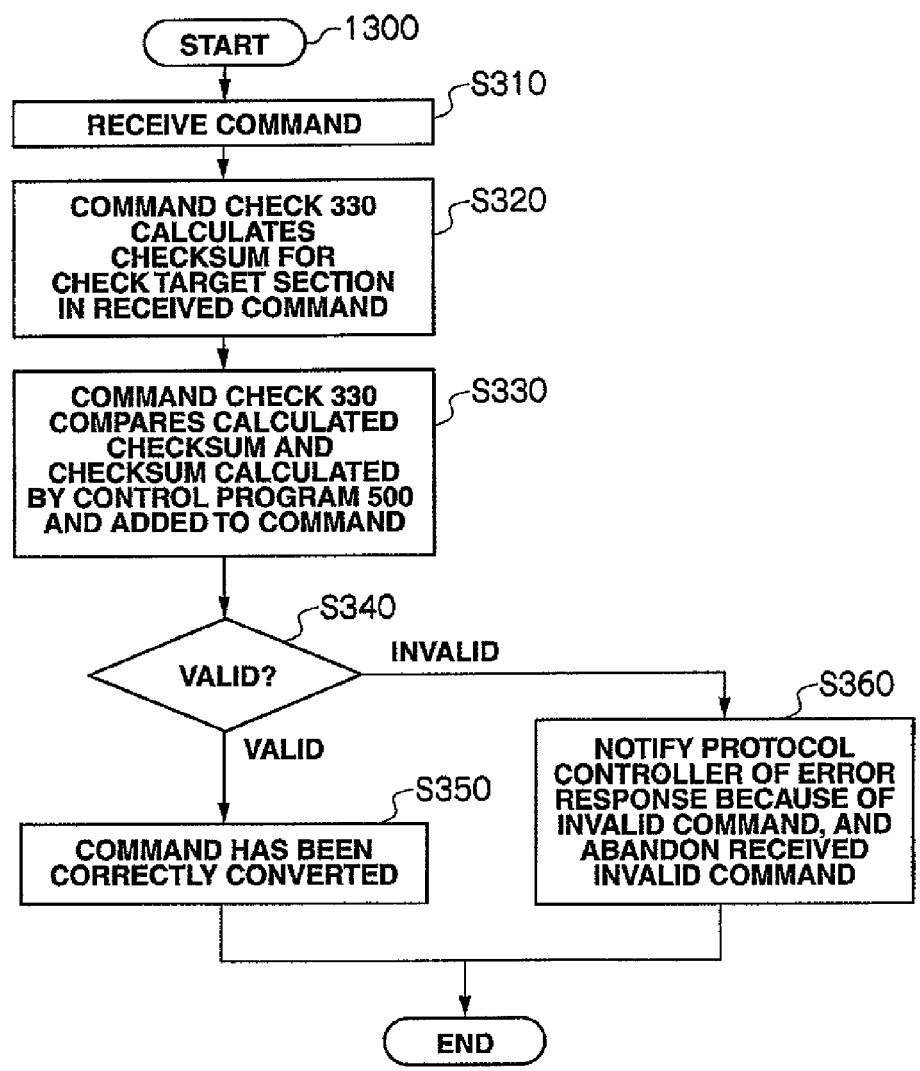
FIG. 13 is a flowchart illustrating command verification program processing.

Next, the content of the command verification processing performed by the command verification program will be described according to the flowchart shown in FIG. 13, which shows the details of step 112 in FIGS. 10 and 11.

First, the port selector 300, receiving a command (S310), calculates a checksum for a verification target section in the received command (S320), compares the calculated checksum value with the checksum value calculated by the control program 500 and added to the command (S330), and judges whether or not those values are the same (S340). If those values are the same, the control program 500 judges that the command has been converted correctly (S350). Meanwhile, if those values are not the same, the control program 500 judges that the command is invalid, and as an error response, notifies the protocol controller 136 of that invalid command and abandons the received invalid command (S360). The processing in this routine thus ends.

According to the present embodiment, the port selector 300, receiving a command generated according to the processing done by the MPU 131, judges whether or not data that forms the command has been corrupted. If the command is valid, the port selector 300 accesses a target drive 160. Meanwhile, if the command is invalid and logical command inconsistency is detected, the port selector 300 forwards the detection result to the MPU 131 via the switch 140A or 140B so that retry processing, and detection and blockage of a malfunctioning part can be performed. Accordingly, a means for detecting a logical command error and performing proper error handling on that error can be provided.

In the second embodiment, both the protocol translation controller and port selector have command verification circuit, and the plural error responses are prepared so that the control program can distinguish between an error detected and returned by the protocol translation controller and an error detected and returned by the port selector. Therefore, the control program can identify a section where data has been logically corrupted, from among a plurality of translation sections such as the protocol translation controller and port selector, etc., by combining the first and second embodiments. Accordingly, the proper malfunctioning section can be disconnected, promptly blocked out and exchanged.

What is claimed is:

1. A port selector for a storage system, which storage system includes: a memory unit including a plurality of storage devices; a plurality of control units for performing processing for data I/O to/from the memory unit in response to a data I/O request from a host device, each control unit comprising: memory for storing a control program; a controller for controlling data I/O processing and generating a command in response to the data I/O request according to the control program; and an initiator for carrying out a first conversion of the command corresponding to a protocol, adding cyclic redundancy check (CRC) to the command, and controlling, according to the command, access to a storage device that is the target of the data I/O request in the memory unit; a plurality of connection paths connecting each of the control units to each of said plurality of storage devices included in the memory unit; and the port selector placed on any of the connection paths for controlling data I/O and for carrying out a second conversion of the command, wherein the port selector corresponds to one of the plurality of storage devices, wherein each controller is configured to predict data that forms the command after being subjected to the first conversion and the second conversion, to calculate a first checksum for the predicted data, and to add the first checksum to the command before the first conversion and the second conversion of the command, wherein the port selector is configured to judge whether or not any command error has occurred in at least one command of a first controller, which at least one command has been subjected to the first conversion and the second conversion, based on comparison between the first checksum and a second checksum, which second checksum is calculated from the data that forms the at least one command subjected to the first conversion and the second conversion, and to perform processing in response to the judgment for the first controller, and wherein the value of the first checksum does not change during a period from after a time it is added to the command until after the at least one command is received by a targeted storage device included in the plurality of storage devices.

2. The port selector for a storage control system according to claim 1, wherein the predicted data comprises data derived from a checksum calculation function.

3. The port selector according to claim 1, wherein a plurality of connection paths, each of which is related to one of a plurality of calculation algorithms, are stored in the memory of the at least one controller, and wherein the first controller is configured to predict the data that forms the at least one command after being subjected to the first conversion and the second conversion and to calculate the first checksum for the predicted data according to one of the plurality of calculation algorithms related to one of the plurality of connection paths which is used by the at least one command.

4. The port selector according to claim 3, wherein each of the plurality of calculation algorithms depends on devices on each of the plurality of connection paths.

5. The port selector according to claim 1, wherein when the port selector judges that no command error has occurred in the at least one command, the judgment concerning the at least one command returns "valid" and the port selector accesses the target storage device via any one of the connection paths; and when the port selector judges that a command error has occurred in the at least one command, the judgment returns "invalid" and the port selector forwards that "invalid" judgment to at least one of the controllers via any one of the connection paths.

6. The port selector according to claim 5, wherein if the port selector detects logical inconsistency in the at least one command when judging whether or not any command error has occurred, the port selector forwards that judgment as the "invalid" judgment to the at least one of the controllers via any one of the connection paths.

7. The port selector according to claim 5, wherein the at least one of the controllers, receiving the "invalid" judgment from the port selector, recognizes the "invalid" judgment and executes retry processing for re-generating the at least one command.

8. The port selector according to claim 7, wherein the at least one of the controllers, recognizing the "invalid" judgment received from the port selector, determines a section of the storage control system that has to be disabled to prevent access to the section based on the recognition result and disables that section according to the judgment.

9. The port selector according claim 8, wherein if the at least one of the controllers judges that the section that has to be disabled is the initiator, the controller disables the initiator; and if the at least one of the controllers judges that the section that has to be disabled is any of the storage devices, the at least one of the controllers performs processing for disabling the relevant storage device.

10. A first controller included in a first control unit of a storage control system including: a memory unit including a plurality of storage devices; a plurality of control units, including said first control unit, for performing processing for data I/O to/from the memory unit in response to a data I/O request from a host device, each control unit comprising: memory for storing a control program; a controller for controlling data I/O processing and generating a command in response to the data I/O request according to the control program; and an initiator for carrying out a first conversion of the command corresponding to a protocol, adding cyclic redundancy check (CRC) to the command, and controlling, according to the command, access to a storage device that is the target of the data I/O request in the memory unit; a plurality of connection paths connecting each of the control units to each of said plurality of storage devices included in the memory unit; and a port selector placed on any of the connection paths for controlling data I/O and for carrying out a second conversion of the command, wherein the port selector corresponds to one of the plurality of storage devices, wherein each controller, including the first controller included in the first control unit, is configured to predict data that forms the command after being subjected to the first conversion and the second conversion, to calculate a first checksum for the predicted data, and to add the first checksum to the command before the first conversion and the second conversion of the command, wherein the port selector is configured to judge whether or not any command error has occurred in at least one command of the first controller, which at least one command has been subjected to the first conversion and the second conversion, based on comparison between the first checksum and a second checksum, which second checksum is calculated from the data that forms the at least one command subjected to the first conversion and the second conversion, and to perform processing in response to the judgment for the first controller, and wherein the value of the first checksum does not change during a period from after a time it is after added to the command until after the command is received by a targeted storage device included in the plurality of storage devices.

11. The first controller according to claim 10, wherein the predicted data comprises data derived from a checksum calculation function.

12. The first controller according to claim 10, wherein a plurality of connection paths, each of which is related to one of a plurality of calculation algorithms, are stored in the memory of the first controller, and wherein the first controller is configured to predict the data that forms the at least one command after being subjected to the first conversion and the second conversion and to calculate the first checksum for the predicted data according to one of the plurality of calculation algorithms related to one of the plurality of connection paths which is used by the at least one command.

13. The first controller according to claim 12, wherein each of the plurality of calculation algorithms depends on services on each of the plurality of connection paths, and each of functions.

14. The first controller according to claim 10, wherein when the port selector judges that no command error has occurred in the at least one command, the judgment concerning the at least one command returns "valid" and the port selector accesses the target storage device via any one of the connection paths; and when the port selector judges that a command error has occurred in the at least one command, the judgment returns "invalid" and the port selector forwards that "invalid" judgment to at least one of the controllers via any one of the connection paths.

15. The first controller according to claim 14, wherein if the port selector detects logical inconsistency in the at least one command when judging whether or not any command error has occurred, the port selector forwards that judgment as the "invalid" judgment to the at least one of the controllers via any one of the connection paths.

16. The first controller according to claim 14, wherein the at least one of the controllers, receiving the "invalid" judgment from the port selector, recognizes the "invalid" judgment and executes retry processing for re-generating the at least one command.

17. The first controller according to claim 16, wherein the at least one of the controllers, recognizing the "invalid" judgment received from the port selector, determines a section of the storage control system that has to be disabled to prevent access to the section based on the recognition result and disables that section according to the judgment.

18. The first controller according claim 17, wherein if the at least one of the controllers judges that the section that has to be disabled is the initiator, the controller disables the initiator; and if the at least one of the controllers judges that the section that has to be disabled is any of the storage devices, the controller performs processing for disabling the relevant storage device.

* * * * *